US008173233B2

United States Patent
Rogers et al.

(10) Patent No.: US 8,173,233 B2
(45) Date of Patent: May 8, 2012

(54) FOAMED FILM PACKAGE

(75) Inventors: Neil John Rogers, Vilvoorde (BE); Michael Remus, Heidelberg (DE)

(73) Assignee: The Procter & Gamble Company, Cincinnati, OH (US)

( * ) Notice: Subject to any disclaimer, the term of this patent is extended or adjusted under 35 U.S.C. 154(b) by 406 days.

(21) Appl. No.: 12/487,093

(22) Filed: Jun. 18, 2009

(65) Prior Publication Data
US 2009/0317578 A1   Dec. 24, 2009

Related U.S. Application Data

(60) Provisional application No. 61/074,344, filed on Jun. 20, 2008, provisional application No. 61/075,170, filed on Jun. 24, 2008.

(51) Int. Cl.
*B29D 22/00* (2006.01)

(52) U.S. Cl. ....... 428/36.5; 383/207; 383/208; 383/209; 383/205; 383/210

(58) Field of Classification Search ............... 428/36.5, 428/317.9, 315.5, 315.7, 319.3; 383/207, 383/208, 209, 205, 210, 211; 206/469, 524.2, 206/524.1
See application file for complete search history.

(56) References Cited

U.S. PATENT DOCUMENTS

| 3,173,826 A | 3/1965 | Campbell et al. |
| 3,336,180 A | 8/1967 | Werner |
| 3,467,569 A | 9/1969 | Weber et al. |
| 3,630,819 A | 12/1971 | Conger |
| 3,700,541 A | 10/1972 | Shrimpton et al. |
| 3,773,545 A | 11/1973 | Erb et al. |
| 3,819,460 A | 6/1974 | Dukess |
| 3,823,047 A | 7/1974 | Colombo |
| 3,824,139 A | 7/1974 | Jay et al. |

(Continued)

FOREIGN PATENT DOCUMENTS

DE   3722139   1/1989

(Continued)

OTHER PUBLICATIONS

International Search Report, PCT/US2009/047625, mailed May 10, 2009, (15 pages).

*Primary Examiner* — N. Edwards
(74) *Attorney, Agent, or Firm* — Laura L. Whitmer; Richard L. Alexander

(57) ABSTRACT

A package includes at least one layer of foamed thin film and an opening feature formed in the layer of foamed thin film. The foamed thin film has a caliper of from about 10 microns to about 250 microns thick. The foamed thin film comprises from about 5% to about 50% density reduction as compared to a non-foamed thin film of substantially the same caliper and substantially the same composition. The package may include foamed thin film made of a plastic resin and a whitening additive that is added to plastic resin. The whitening additive is selected to produce a foamed thin film having an opacity value of from about 35% to about 99%. The whitening agent is of substantially the same composition and is present in substantially the same amount as would be selected to produce substantially the same light reflectivity in a non-foamed thin film of substantially the same caliper and substantially the same composition.

16 Claims, 2 Drawing Sheets

U.S. PATENT DOCUMENTS

| | | | |
|---|---|---|---|
| 3,844,814 A | 10/1974 | Bettoli et al. | |
| 3,855,376 A | 12/1974 | Ono et al. | |
| 3,870,591 A | 3/1975 | Witman | |
| 3,871,897 A | 3/1975 | Ealding | |
| 3,891,487 A | 6/1975 | Hoey | |
| 3,927,236 A | 12/1975 | Shultz | |
| RE28,682 E | 1/1976 | Hoey | |
| 3,930,917 A | 1/1976 | Esakov et al. | |
| 3,983,287 A | 9/1976 | Goossen et al. | |
| 3,995,087 A | 11/1976 | Desanzo | |
| 4,012,248 A | 3/1977 | Rump et al. | |
| 4,107,247 A | 8/1978 | Dukess | |
| 4,183,435 A | 1/1980 | Thompson et al. | |
| 4,251,584 A | 2/1981 | vanEngelen et al. | |
| 4,264,657 A | 4/1981 | Tollette | |
| 4,273,816 A | 6/1981 | Tollette | |
| 4,303,721 A | 12/1981 | Rodriguez et al. | |
| 4,522,675 A | 6/1985 | Sharps | |
| 4,533,578 A | 8/1985 | Boyd et al. | |
| 4,576,860 A | 3/1986 | Fink et al. | |
| 4,657,811 A | 4/1987 | Boyd et al. | |
| 4,672,230 A * | 6/1987 | Spahn | 307/116 |
| 4,696,709 A | 9/1987 | Hargarten et al. | |
| 4,746,477 A | 5/1988 | Wecker et al. | |
| 4,781,292 A | 11/1988 | Sacherman et al. | |
| 4,781,294 A * | 11/1988 | Croce | 206/469 |
| 4,927,647 A | 5/1990 | Bailey | |
| 4,966,805 A | 10/1990 | Ezawa et al. | |
| 5,000,992 A | 3/1991 | Kelch | |
| 5,069,953 A | 12/1991 | Kishikawa et al. | |
| 5,343,560 A | 8/1994 | Takeda et al. | |
| 5,354,601 A | 10/1994 | Kamijo et al. | |
| 5,380,094 A | 1/1995 | Schmidt et al. | |
| 5,855,435 A * | 1/1999 | Chiesa | 383/204 |
| 5,910,358 A | 6/1999 | Thoen et al. | |
| 6,066,391 A | 5/2000 | Ogawa et al. | |
| 6,203,874 B1 | 3/2001 | Nagafuchi | |
| 6,281,167 B1 | 8/2001 | Takano et al. | |
| 6,309,105 B1 * | 10/2001 | Palumbo | 383/211 |
| 6,544,450 B2 | 4/2003 | Welsh et al. | |
| 6,652,933 B2 | 11/2003 | Hall | |
| 6,811,843 B2 | 11/2004 | DeBraal et al. | |
| 6,814,253 B2 | 11/2004 | Wong | |
| 6,818,282 B2 | 11/2004 | Hynicka et al. | |
| 6,933,043 B1 | 8/2005 | Son et al. | |
| 7,021,827 B2 * | 4/2006 | Compton et al. | 383/205 |
| 7,252,866 B2 | 8/2007 | Tang et al. | |
| 7,585,557 B2 * | 9/2009 | Aylward et al. | 428/195.1 |
| 7,717,620 B2 * | 5/2010 | Hebert et al. | 383/203 |
| 8,038,349 B2 * | 10/2011 | Andersson et al. | 383/205 |
| 2002/0006975 A1 | 1/2002 | Welsh et al. | |
| 2002/0114927 A1 | 8/2002 | Brossman et al. | |
| 2003/0003251 A1 | 1/2003 | DeBraal et al. | |
| 2003/0021955 A1 | 1/2003 | Brossman et al. | |
| 2003/0099823 A1 | 5/2003 | Lin | |
| 2003/0124337 A1 | 7/2003 | Price et al. | |
| 2003/0186046 A1 | 10/2003 | Mao | |
| 2005/0181196 A1 * | 8/2005 | Aylward et al. | 428/304.4 |
| 2006/0263564 A1 | 11/2006 | Steyaert | |
| 2008/0138593 A1 * | 6/2008 | Martinez | 428/220 |
| 2009/0317578 A1 * | 12/2009 | Rogers et al. | 428/40.1 |

FOREIGN PATENT DOCUMENTS

| | | |
|---|---|---|
| DE | 10237818 | 2/2004 |
| EP | 32248 A1 | 7/1981 |
| EP | 83167 A1 | 7/1983 |
| EP | 84360 A2 | 7/1983 |
| EP | 450331 A1 | 3/1991 |
| EP | 456890 B1 | 5/1996 |
| EP | 390442 B1 | 1/1997 |
| EP | 1310357 A1 | 5/2003 |
| EP | 1 409 366 B1 | 6/2006 |
| EP | 1646677 B1 | 7/2007 |
| WO | WO 97/33948 A1 | 9/1997 |
| WO | WO 99/00177 A1 | 1/1999 |
| WO | WO 2005/007729 A1 | 1/2005 |
| WO | WO 2005/082618 A1 | 9/2005 |

* cited by examiner

FOAMED FILM PACKAGE

CROSS REFERENCE TO RELATED APPLICATION

This application claims the benefit of U.S. Provisional Application Nos. 61/074,344, filed on Jun. 20, 2008 and 61/075,170, filed on Jun. 24, 2008, the substances of which are incorporated herein by reference.

FIELD OF THE INVENTION

This invention relates to the field of packages comprising a foamed film layer.

BACKGROUND OF THE INVENTION

Polyolefin plastic film is used to construct a wide variety of packages such as bags and pouches that hold consumer goods. For example, bags holding stacks of disposable diapers or hygiene articles, pouches for wet wipes, and bags containing granular laundry detergent are often made from plastic film. The plastic film that forms a package may be a single layer of film (called a monofilm), or a combination of layers that for example can be co-extruded, a laminate of separately produced layers that are adhered to one another, or an extrusion lamination whereas one layer is extruded onto another previously formed layer(s).

The specific composition of the film or films that make up the package are selected for a variety of characteristics including liquid or gas permeability, appearance, and strength. Another relevant characteristic of plastic film used for packaging is opacity. The level of opacity of the plastic film used in a package impacts the appearance of the package by controlling the extent to which the package's contents are visible through the package. In some circumstances, a higher opacity film may be desirable to protect the contents from exposure to light. Additives such as titanium oxide or other white or colored pigments are mixed with the resin for the purpose of increasing the opacity of a film. In general, decreasing the amount of resin by in a film by making the film thinner will in turn reduce its opacity.

Many plastic film packages include opening features, such as, for example, lines of weakness and/or peelable labels covering die cut openings. These lines of weakness and/or peelable labels covering die cut openings are configured to provide convenient consumer access to the contents of the package while maintaining the integrity of the unopened package during shipment and storage. Lines of weakness, such as perforations or scores, provide a mechanism by which the consumer can, in a controlled manner, tear open a package along a predetermined opening trajectory. The label and die cut dispensing opening combination may be configured to provide a re-sealable package for items that require retention of moisture and/or other product ingredients within the package and/or items for which it is desirable to exclude contamination. The die cut defines the dispensing opening through which items are dispensed. The label is sized to overlap the perimeter of the die cut dispensing opening. The label tears the die cut from the package the first time the label is peeled from the package. The label may be capable of completely re-covering and re-sealing the dispensing opening formed by the die cut.

Much of the cost associated with plastic film packages is the cost of the plastic resin that is used to make the film. Because the amount of plastic resin in the film is directly related to the caliper (or thickness) of the film, efforts to reduce cost in plastic film packages typically involve using a lower caliper film that can still provide the necessary characteristics for a particular package. Because lower caliper film is typically weaker in terms of inherent film tear strength, changing to a lower caliper film in packages that includes an opening feature (e.g., lines of weakness or die cut dispensing openings) requires a redesign of the opening feature to compensate for the lower tear strength of the film. For example, the cuts in a line of perforations may be made shorter to leave more film intact between the cuts to resist unintentional tearing of the line of perforations. Scores in the film may be made more shallow to provide additional strength to resist unintentional tearing of a lower caliper film. Film connections between the cuts that define a die cut may be made longer to resist unintentional separation of the die cut from the film. The redesign of the opening feature is costly in terms of engineering and evaluation time. In addition, the redesign of the opening feature typically requires laborious adjustments of various manufacturing components and processes that create the opening feature on the film and possibly the purchase of new tooling as well.

Recent technological developments have made it feasible to produce foamed polyolefin film of suitable thickness (from about 10 microns to about 250 microns) and strength for the types of packages described above. Several exemplary foamed polyolefin films that are suitable for packages are described in European Patent No. 1 646 677. The use of foamed thin film allows for replacement of part of the resin (e.g., from about 5% to about 50% by weight) with gaseous bubbles that are formed or incorporated in the film during a foaming process. Because the voids or cells left by the bubbles occupy volume that was formerly filled with resin, foamed film allows for a reduction in resin without a corresponding reduction in film caliper. One notable feature of foamed thin films is that they have a rough surface texture as compared to a non-foamed film of substantially the same caliper.

In spite of the cost savings in terms of resin usage, foamed thin film has not been used for packages with opening features (e.g., lines of weakness or die cut dispensing openings with labels). This may be because it would be expected that the use of a foamed thin film of substantially the same caliper (but with significantly less resin) would necessitate redesign of the opening features to compensate for reduced tear strength. As discussed above, such a redesign of the opening features would require engineering and test time, labor intensive adjustments to manufacturing components, and possibly retooling of manufacturing equipment. In addition, it would be expected that the rough surface texture would also call for adjustment to the manufacturing components and processes.

SUMMARY OF THE INVENTION

A package and a method of constructing a package that includes at least one layer of foamed thin film and an opening feature formed in the at least one layer of foamed thin film is provided. The foamed thin film has a caliper of from about 10 microns to about 250 microns thick. The foamed thin film comprises from about 5% to about 50% density reduction as compared to a non-foamed thin film of substantially the same composition and caliper.

The opening feature may include a line of weakness. Advantageously, the line of weakness may be of substantially the same configuration as a line of weakness configured for use in a non-foamed thin film of substantially the same composition and caliper. The yield stress value of the at least one layer of foamed thin film with the line of weakness may be at least about 90% of the yield stress value of the foamed thin film without the line of weakness. The opening feature may be, for example, in the form of perforations, scores, or embossments.

Alternatively, the opening feature may include a die cut dispensing opening and a label adhered to the die cut such that the label overlaps an opening defined by the die cut. In this case, the label has adhesive applied to a first side whereby the label is adhered to the die cut and peelably adhered to the foamed thin film about a periphery of the opening. Advantageously, the adhesive may be of substantially the same composition as adhesive configured for use on a non-foamed thin film of substantially the same composition and substantially the same caliper.

A package may comprise a monolayer foamed film, or multiple layers where at least one layer is foamed. A package may include a foamed thin film co-extrusion that includes at least one foamed thin film layer. A package may include a foamed thin film laminate that includes at least one foamed thin film layer. The foamed thin film layer may be, for example, blown, cast, process oriented (i.e., stretched, drawn or tentered) in the cross or machine orientated direction, foamed polyethylene or foamed polypropylene.

The opening feature in the foamed thin film may be formed by weakening a selected opening trajectory or path on the foamed thin film by non-contact means (e.g. laser, spark arcs) or mechanically via a blade, punch or pin or by weakening the selected opening trajectory with a deforming profile.

A package may include at least one layer of foamed thin film made of a plastic resin and a whitening or coloring additive that is added to the plastic resin. The whitening or coloring additive is selected to produce a foamed thin film having an opacity value of from about 35% to about 99%. The whitening agent is of substantially the same composition and is present in substantially the same amount as would be selected to produce substantially the same light reflectivity in a non-foamed thin film of substantially the same caliper and substantially the same composition.

DETAILED DESCRIPTION OF THE INVENTION

Foamed Films

As used herein, the term "thin film" designates a film having a caliper that is suitable for use in packages such as bags and pouches for consumer goods, such as, for example, film calipers from about 10 to about 250 microns.

As used herein, the term "foamed thin film" designates a film containing at least one layer having a caliper from about 10 microns to about 250 microns and that comprises gaseous bubbles, void volumes, or cells wherein that the at least one layer exhibits a density reduction of at least about 5% by yield (as determined by ASTM D4321) versus a film of the same thickness that does not comprise gaseous bubbles, void volumes, or cells.

Figure 1A:
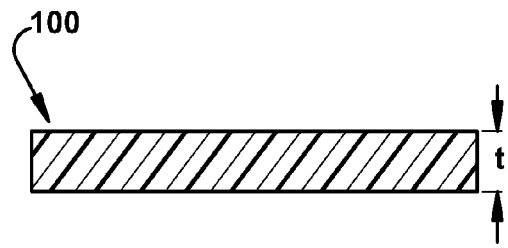
FIG. 1a is cross section view of a prior art thin film that can be used to construct thin film packages with an opening feature.

FIG. 1a is a cross section view of a thin film 100 that is used in many packaging applications such as bags and pouches that hold consumer goods. Thin films 100 used in such packages typically have a caliper (thickness) from about 10 microns to about 250 microns and are made of a polyolefin resin. Many different blends of components are used in the polyolefin and components are selected for a variety of properties such as strength and opacity. Polyethylene (e.g., Low Density Polyethylene LDPE, Linear Low Density Polyethylene LLDPE, High Density Polyethylene HDPE, Medium Density Polyethylene MDPE, Metallocene Polyethylene mPE, Ethyl Vinyl Acetate EVA and mixtures thereof) and polypropylene, and blends thereof are two types of materials that are often used to manufacture thin films 100. Thin films 100 can be manufactured using blown film, cast film, and extrusion base processes. As can be seen in FIG. 1a, the thin film 100 is made up of a substantially solid layer of resin. The thin film 100 shown in FIG. 1a is called a monofilm because it consists of a single layer of resin.

Figure 2A:
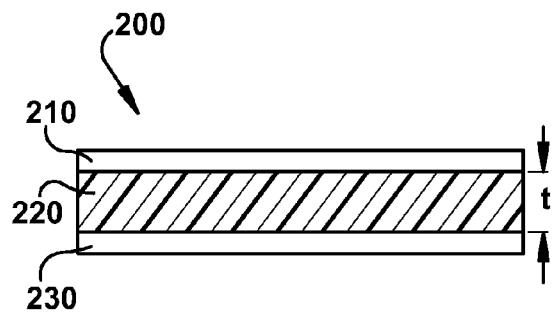
FIG. 2a is a cross section view of a prior art thin film co-extrusion that can be used to construct packages with an opening feature.

FIG. 2a is a cross section view of a thin film co-extrusion 200 that includes a top layer 210, a core 220, and a lower layer 230. Many film packages use thin film co-extrusions because the composition of each layer may be selected to contribute a desired quality to the resulting package. To produce a thin film co-extrusion, resins for each layer are co-extruded while molten and cooled together to form a layered thin film co-extrusion. As can be seen in FIG. 2a, the thin film co-extrusion 200 includes layers (e.g., the top layer 220, core layer 220, and lower layer 230) of each type of resin directly adjacent one another. Thin film co-extrusions may include layers that are selected to provide, for example, strength, opacity, print quality, and moisture resistance. As can be seen in FIG. 2a, the thin film co-extrusion 200 includes layers that are made up of substantially solid layers of resin.

Figure 3A:
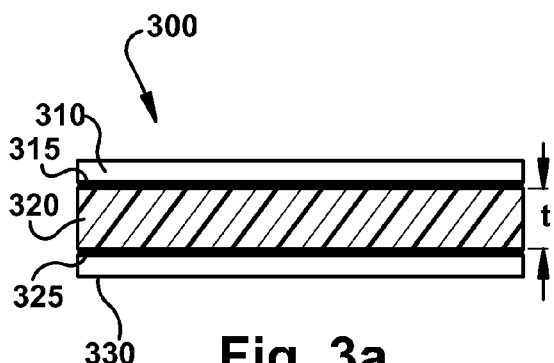
FIG. 3a is a cross section view of a prior art thin film laminate that can be used construct packages with an opening feature.

FIG. 3a is a cross section view of thin film laminate 300 that includes a top layer 310, a top adhesive layer 315, a core 320, a bottom adhesive layer 325, and a bottom layer 330. Thin film laminates 300 are similar to thin film co-extrusions 200 because both include layers of different resins that are selected to contribute a desired quality to the resulting package. However, rather than being combined in a molten form, the layers of a thin film laminate 300 are separately formed and cooled. Laminates are often used when one or more of the layers is not well suitable for co-extrusion, such as, for example, metalized layers that require significantly different processing techniques as compared to plastic layers. The separate layers (e.g., the top layer 310 the core 320, and the bottom layer 330) are then fixed to one another, such as, for example, using adhesive (e.g., the top adhesive layer 315 and the bottom adhesive layer 325). As can be seen in FIG. 3*a*, the thin film laminate 300 includes layers that are made up of substantially solid layers of resin.

Figure 1B:
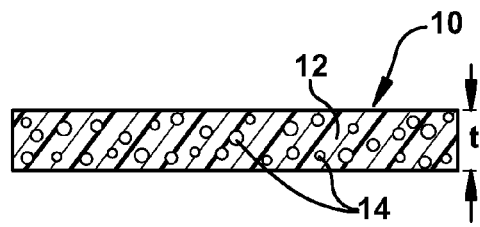
FIG. 1b is a cross section view of a foamed thin film that can be used to construct foamed thin film packages with an opening feature in accordance with one or more embodiments of the present invention.
Figure 2B:
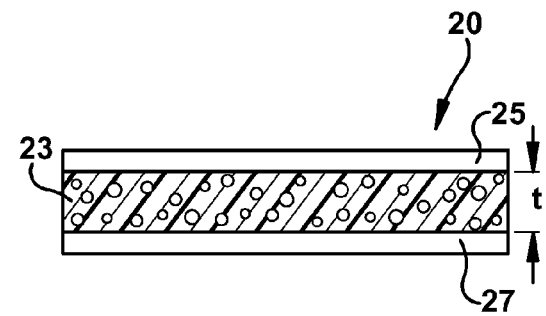
FIG. 2b is a cross section view of a foamed thin film co-extrusion that can be used to construct packages with an opening feature in accordance with one or more embodiments of the present invention.
Figure 3B:
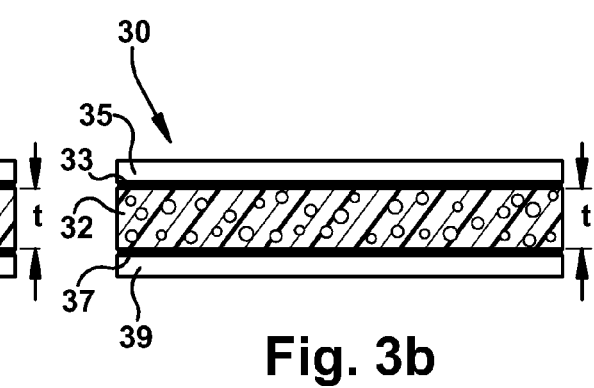
FIG. 3b is a cross section view of a foamed thin film laminate that can be used to construct packages with an opening feature in accordance with one or more embodiments of the present invention.

FIGS. 1*b*, 2*b*, and 3*b* illustrate various foamed thin films 10, 20, 30 that are suitable for use in packaging applications. The foamed thin films 10, 20, 30 each include at least one foamed layer, 12, 23, 32, respectively. As discussed above, until recently thin films for use in packaging were not believed to be suitable for foaming because of concerns about potential degradations in tear strength that could be brought about by the loss of resin content in a foamed film. EP 1 646 677 provides details about specific resin compositions and processing steps that enable the production of foamed thin films.

Referring to FIG. 1*b*, a foamed thin monofilm 10 made up of a resin 12, such as, for example, polyolefin, in which gas bubbles 14 are entrapped is shown. One way to produce foamed monofilm 10 is adding one or more chemical blowing agents such as, for example, Sodium Hydro Carbonate Powder and an acidifier to the master batch of resin 12 prior to heating. Upon heating, chemical blowing agents release carbon dioxide. The carbon dioxide expands and forms bubbles 14 in the monofilm 10 during subsequent processing steps. One exemplary chemical equation describing the transition of the blowing agent to carbon dioxide is:

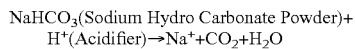

$NaHCO_3$(Sodium Hydro Carbonate Powder)+ $H^+$(Acidifier)→$Na^+$+$CO_2$+$H_2O$

Some of the carbon dioxide bubbles 14 escape the molten resin 12 while others are trapped in the resin 12 during cooling to form voids that remain after solidification of the resin. An alternative to the use of chemical blowing agents that react in the resin to produce bubbles 14 is to inject a gas such as carbon dioxide into the plastic extruder during film manufacture. While the bubbles 14 shown in FIG. 1*b* are generally spherical and have a diameter from about 10 microns to about 100 microns, other shapes are contemplated. For example, in some foamed films, the bubbles are generally cigar shaped and oriented in the direction of film extrusion. In a foamed thin polyethylene monofilm having a caliper of about 40 microns, a typical cigar shaped bubble may be about 10 microns in diameter and from about 50 microns to about 300 microns in length. The foam structure of a foamed thin monofilm 10 is generally closed towards the surface such that substantially all of the bubbles 14 close to the surface are closed. Because the bubbles 14 occupy volume that would have been occupied by resin 12 in a non-foamed thin film, the foamed thin monofilm 10 in FIG. 1*b* uses less resin 12 than its non-foamed counterpart 100 in FIG. 1*a* while maintaining substantially the same overall thickness "t." Of course, other foaming methods may be employed in the practice of the present invention, such as, for example, blowing gas into the molten resin.

FIG. 2*b* shows a foamed thin film co-extrusion 20 that includes a foamed core 23 and a non-foamed top layer 25 and a non-foamed bottom layer 27. While only the core 23 is shown as foamed, any combination of layers in a foamed thin film co-extrusion may be foamed, including the top layer 25, the bottom layer 27, or the top layer 25 and the bottom layer 27, or all three layers 23, 25, 27. In addition, the core 23 need not be foamed if any other layer is foamed and any number of foamed and non-foamed layers may be present in the foamed thin film co-extrusion. The use of foamed thin film co-extrusions 20 is well suited for many packaging applications because layers can be selected for tensile strength, sealing properties, cost, and aesthetic impression. It has been observed that in foamed thin film co-extrusions, foaming in one layer is limited to the foamed layer. That is, foaming does not appear to induce foaming in adjacent non-foamed layers.

By way of example, a bag adapted for storing large granules is constructed of a thin film laminate that includes the thin film co-extrusion 200 (FIG. 2*a*) as a base layer. This particular thin film co-extrusion 200 is configured to present a white outer surface on which a printed top layer (not shown) is applied while creating a blue inner surface that enhances the appearance of the white granules stored in the bag when viewing the granules through the bag's opening. The top layer 210 of the thin film co-extrusion 200 is made of a white polyethylene film having a caliper of approximately 15 microns that is adapted for improved interaction with the printed top layer (not shown). The core 220 is made of a white polyethylene film having a caliper of approximately 40 microns that is adapted to mask the blue color from the bottom layer 230 from showing through. The bottom layer 230 is made of a blue polyethylene film having a caliper of approximately 15 microns that is adapted to present a visually appealing background for the granules in the bag.

The foamed thin film co-extrusion 20 shown in FIG. 2*b* may be used to replace the thin film co-extrusion 200. The foamed thin film co-extrusion 20 includes a top layer 25 made of an extreme white polyethylene film having a caliper of approximately 15 microns, a core 23 made of a foamed light white polyethylene film having a caliper of approximately 40 microns, and a bottom layer made of a blue polyethylene film having a caliper of approximately 15 microns. The foamed core 23 uses about half as much resin as the non-foamed core (e.g., core 220 in FIG. 2*a*). To compensate for the change in appearance caused by the presence of bubbles in the core 23, much of the white or colored pigment in the core 23 was removed to reduce the contrast between bubble and resin. The white intensity of the top layer was increased to achieve a comparable appearance between the thin film co-extrusion 200 and the foamed thin film co-extrusion 20. Of course, the development of a foamed thin film co-extrusion to replace an existing thin film co-extrusion may involve changing the caliper of different layers, changing the material composition of different layers, and/or adding or removing layers.

FIG. 3 illustrates a foamed thin film laminate 30 that includes a foamed core 32 and a non-foamed top layer 35 and bottom layer 39. While only the core 32 is shown as foamed, any combination of layers in a foamed thin film laminate may be foamed, including the top layer 35, a bottom layer 39, both top layer 35 and bottom layer 39, or all three layers 32, 35, 39. In addition, the core 32 need not be foamed if any other layer is foamed and any number of foamed and non-foamed layers may be present in the foamed thin film laminate. The use of foamed thin film laminates 30 is well suited for many packaging applications, especially for packages that require a layer that is not readily co-extruded with other layers in the foamed thin film laminate. It is believed that the same types of adhesive (e.g., adhesives 315 and 325) used in non-foamed thin film laminates may be used as adhesives (e.g., adhesives 33, 37) to adhere layers in foamed thin film laminates.

Opening Features

As used herein, the term "opening feature" is defined as an aid to opening of the package that includes a weakening of a selected opening trajectory on the foamed thin film. Two examples of such opening features are linear lines of weakness and die cut dispensing openings with labels.

Figures 4A, 4B:
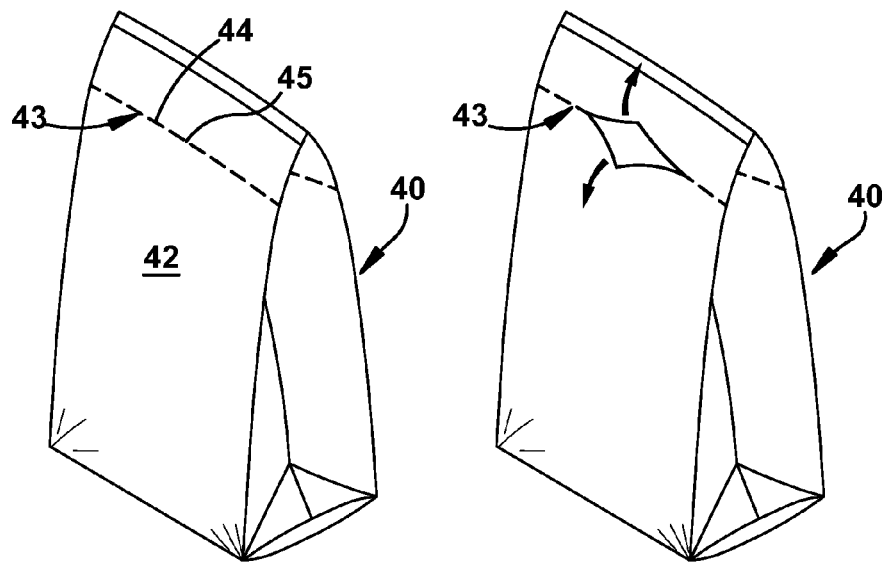
FIGS. 4a and 4b are perspective views of a package with a line of weakness constructed in accordance with one or more embodiments of the present invention.

FIGS. 4a and 4b illustrate a bag 40 that includes walls of foamed thin film 42 and a linear line of weakness 43. The line of weakness 43 is configured to remain intact until opened by the consumer along a linear opening trajectory as shown by the arrows in FIG. 4b. The line of weakness 43 can be formed, for example, from a line of scores that partially cut through the wall 42 of the bag 40 or a line of perforations that completely cut through the wall 42 of the bag 40. The lines of weakness 43 are of substantially the same configuration as lines of weakness that are configured for use in a bag (not shown) having non-foamed thin film walls of substantially the same caliper. The lines of weakness can be produced using methods including scoring and perforation. The scoring or perforation may be performed using a laser or by mechanical means. The methods and method parameters used to produce the line of weakness 43 in a foamed thin wall (e.g., wall 42) are substantially the same as methods used to produce a line of weakness in a non-foamed thin wall of substantially the same caliper.

One method of making a line of weakness uses at least one laser. First a laser beam with sufficient wattage to evaporate a portion of the film material is focused onto the thin film. The use of laser technology allows for very accurate control of the depth of penetration from very slight scoring to complete perforation of the thin film. A laser using any form of electromagnetic radiation can be used. Suitable lasers for making lines of weakness in thin films include those based on $CO_2$ gas.

Another suitable method for producing the lines of weakness is the use of blades. The blades are installed on a cylinder, which is mounted directly on the film processing machinery so that the cuts are made prior to formation of the bag as the film travels past the blade-equipped cylinder Different blade patterns can be used to get different patterns in the line of weakness. The pressure applied to the blades is also varied during the process to control the dimensions and depth of the cuts to ensure the bag opens easily.

Embossing is another alternative method for production of lines of weakness. The embossing technology weakens the thin film in specific areas by means of pressure, temperature, processing time and a deforming profile. The desired results are achieved by changing the caliper and/or material structure at the embossing trajectory. The basic equipment used for embossing consists of a sealing jaw capable of pressing against a back plate. A deforming profile or pattern is fixed to the jaw and heated. The thin film is pressed between the deforming profile and the back plate. The main variables known to affect this process are: heating temperature, cooling temperature, pressure, heating time, cooling time, film tension while embossing, film tension after embossing, back plate material, back plate thickness, back plate temperature, jaw pattern and jaw thickness. The embossing unit is typically installed after an unwinding station of the thin film and could be incorporated into the packaging production line. EP 1 409 366 describes methods of producing lines of weakness in non-foamed thin films in detail.

Lines of weakness in foamed thin film (e.g., line of weakness 43 in FIGS. 4a and 4b and die cut line of weakness 52 in FIG. 5) may form many different patterns. Those patterns may take the form of a continuous line, a dashed line, or combinations thereof. One exemplary line of weakness is a dashed line 43 that includes a plurality of scored segments 44. The length of each scored segment 44 varies from about 0.12 mm to about 4.4 mm. The distance of the connections or bridges 45 between adjacent scored segments 44 varies from about 0.4 mm to about 4 mm. The score depth may vary depending on the thickness of the foamed thin film. Notably, any pattern that is suitable for use in a non-foamed thin film wall will also be suitable for use in a foamed thin film wall of substantially the same caliper.

Lines of weakness 43, 52 are designed to deteriorate the strength of the foamed thin film in such a way that it can withstand normal filling, packing and handling operation and yet be easily opened by the consumer. This is achieved by reducing the trapezoidal tear strength of the foamed thin film. Reduction of the trapezoidal tear strength is also generally accompanied by loss of tensile strength.

The line of weakness 43, 52 may be characterized using the following test methods: a) ASTM D-882 Standard Test Method for Tensile Properties on Thin Plastic Sheeting and b) ASTM D-5733 Standard Test Method for Tearing Strength of Nonwoven Fabrics by the Trapezoidal Procedure. The line of weakness 43, 52 may be characterized by three parameter values obtained from these standard tests. The first is yield stress value. The yield stress value of the foamed thin film with a line of weakness as measured by ASTM D-882 should be no less than about 90% of the yield stress value of the foamed thin film without a line of weakness. Second, the final or rupture stress value of the foamed thin film with the line of weakness should be no lower than about 90% of the yield stress value of the foamed thin film without the line of weakness. Third, the average trapezoidal tearing force according to ASTM D-5733 of the foamed thin film with the line of weakness should be less than about 4 kilograms of force.

Figure 5:
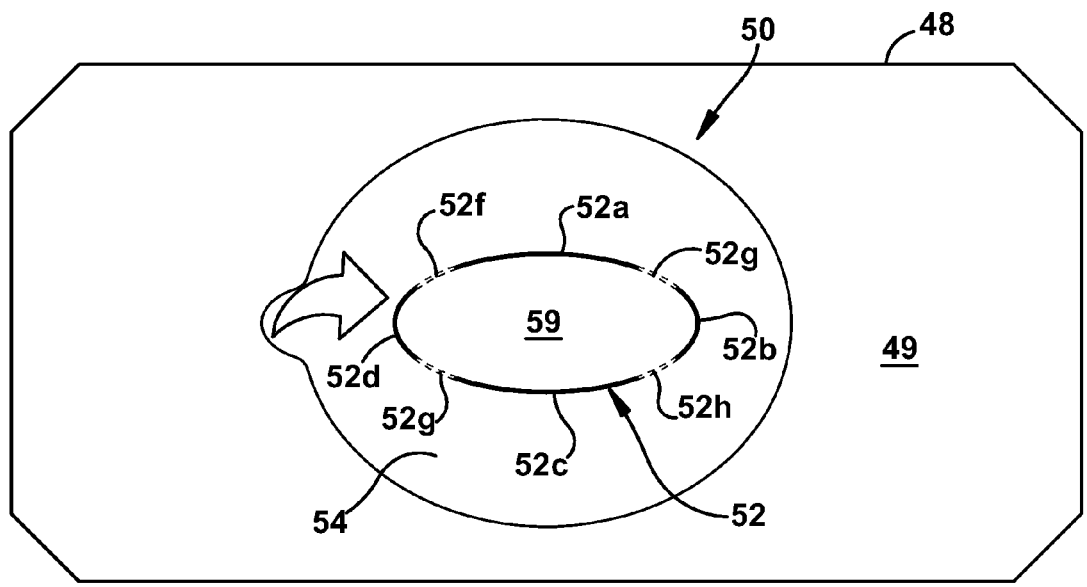
FIG. 5 is a top plan view of a package with a label and die cut dispensing opening constructed in accordance with the present invention.

FIG. 5 is a top plan view of a package 48 having at least one foamed thin film wall 49. The package 48 includes a die cut dispensing opening/label combination 50 that enables a user to reseal the package 48 after dispensing items from the package 48. A die cut line of weakness 52, which can be seen through the label 54 in FIG. 5, is formed in the foamed thin film wall 49. The die cut line of weakness 52 may have a significantly larger proportion of weakened foamed film material than the line of weakness 43 in FIGS. 4a and 4b. The die cut line of weakness 52 is shown having four long perforations 52a-52d that are attached by relatively small connections or bridges 52e-52h. The large proportion of weakened foam film material in the die cut line of weakness means that very little force will be required to completely separate a die cut 59 defined by the die cut line of weakness 52 from the foamed thin film wall 49. A label 54 covers and overlaps the die cut 59. The label 54 is adhered to the foamed thin wall 49 with, for example, adhesive (of course other methods of adhesion can be used).

Figure 6:
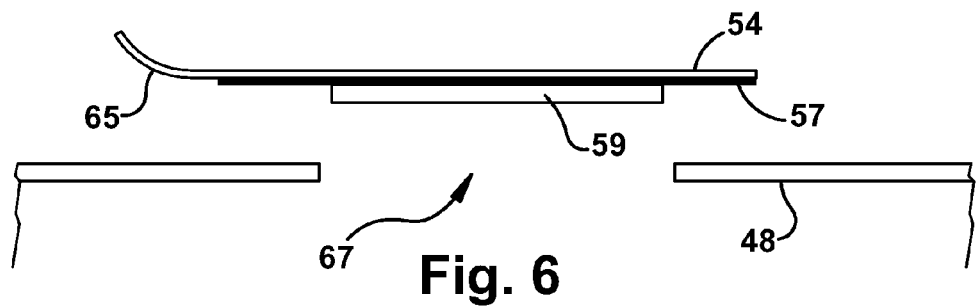
FIG. 6 is an exploded fragmentary cross section view of the package of FIG. 5.

To dispense an item from the package 48, the consumer peels an edge of the label 54 as indicated by the arrow in FIG. 5. In the first use, the label 54 pulls the die cut 59 free from the foamed thin wall 49 by rupturing the bridges 52e-52h. The die cut 59 remains adhered to an underside of the label 54 as shown in FIG. 6. To reseal the package 48, the consumer re-adheres the label 54 to the foamed thin wall 49.

FIG. 6 is an exploded cross section view of the die cut dispensing opening/label combination 50 and the foamed thin wall 49. Adhesive 57 is shown on an underside of the label 54 with an optional adhesive-free region 65 at a lead edge of the label 54 that defines a tab that can be gripped by a consumer. The die cut 59 defines a dispensing opening 67 through which items are dispensed from the package 48. In other embodiments (not shown), regions of different types of adhesive may be present on the underside of the label and the die cut dispensing opening/label combination may include intermediate layers disposed between the package and the label.

The perforations (or scores) 52a-d (FIG. 5) that are used in the die cut line of weakness 52 are produced according to the same methods described above with respect to lines of weakness 43 (FIGS. 4a, 4b). As with the lines of weakness 43, the methods and method parameters used to produce the die cut line of weakness 52 in a foamed thin wall (e.g., wall 49) are substantially the same as methods used to produce a die cut dispensing opening in a non-foamed thin wall of substantially the same caliper. In addition the adhesive that is used on the label 54 in a die cut dispensing opening/label combination (e.g., die cut dispensing opening/label combination 50) used on a foamed thin wall (e.g. the foamed thin wall 49) is substantially the same as adhesive (e.g., the adhesive 57) that is used on a label used with a non-foamed thin wall of substantially the same composition.

Opacity

As discussed above, the opacity of plastic films is adjusted using whitening additives to achieve a desired appearance and protection against light. While many methods can be used to determine the opacity of a plastic film, two exemplary test methods are described in ASTM 2805 and ISO 2471. Opacity is generally expressed in terms of a percentage of light that is absorbed by the film. For opaque LDPE thin films used in packaging, an opacity value of from about 35% to about 99% is usually acceptable.

Typically, a reduction in film caliper results in a loss of opacity, which requires an increase in whitening additives such as titanium dioxide, or other coloring additives. Thus, it would seem that the substitution of a foamed thin film for a non-foamed thin film would likewise require an increased amount of whitening or coloring additives to compensate for the reduction in the amount of resin that is present in the foamed thin film. In addition, the presence of voids in the foamed thin film would seem to further reduce the opacity of the foamed thin film as compared to a non-foamed film counterpart.

It has been discovered that the reduction in opacity of a foamed thin film (e.g., mono film 10 in FIG. 1b) as compared to its non-foamed thin film counterpart (e.g., mono film 100 in FIG. 1a) is not proportional with respect to the reduction in resin weight. In other words, the opacity of the foamed thin film (e.g., mono film 10) is only slightly lower than the opacity of the non-foamed thin film counterpart (e.g., mono film 100) even when a significant amount of the resin has been removed due to foaming. The degradation in opacity is much less than would be expected based on the reduction in resin weight. This may be due to light reflecting back at many angles as it encounters the curved inner surfaces of the voids left by bubbles. As such, in many instances it is not necessary to make any adjustments to the amount of whitening or coloring additives used to achieve a desired opacity when using a foamed thin film in place of a non-foamed film of substantially the same caliper and composition.

As can be seen by the foregoing description, the use of foamed thin films in packaging applications that include opening features allows for resin savings and, surprisingly, the methods of producing the opening features as well as the configuration of the opening features remains substantially the same as with non-foamed thin films of substantially the same caliper. In addition, foamed thin films provide substantially similar levels of opacity to their non-foamed thin film counterparts. These discoveries allow for a new and ready use of foamed thin films for non-foamed thin films in packages with opening features and/or a need for a level of opacity.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A package comprising:
   at least one layer of foamed thin film comprising gaseous bubbles, void volumes, or cells, wherein the layer of foamed thin film has a caliper of between about 10 and 250 microns and comprises between about 5% to 50% density reduction as compared to a non-foamed thin film of substantially the same caliper that does not comprise gaseous bubbles, void volumes, or cells; and
   an opening feature selected from the group consisting of a line of weakness and a die cut that defines a dispensing opening, formed in the layer of foamed thin film.

2. The package of claim 1 wherein the opening feature comprises a line of weakness.

3. The package of claim 2 wherein the line of weakness is of substantially the same configuration as a line of weakness configured for use in a non-foamed thin film of substantially the same caliper that does not comprise gaseous bubbles, void volumes, or cells.

4. The package of claim 2 wherein a yield stress value of the layer of foamed thin film with the line of weakness is at least about 90% of the yield stress value of a foamed thin film without the line of weakness.

5. The package of claim 1 wherein the opening feature comprises a die cut that defines a dispensing opening and a label adhered to the die cut such that the label overlaps the dispensing opening, the label having adhesive applied to a first side whereby the label is adhered to the die cut and peelably adhered to the foamed thin film about a periphery of the opening.

6. The package of claim 1 wherein the package comprises a foamed thin film co-extrusion.

7. The package of claim 1 wherein the package comprises a foamed thin film laminate.

8. The package of claim 1 wherein the foamed thin film comprises blown foamed polyethylene.

9. The package of claim 1 wherein the foamed thin film comprises foamed polypropylene.

10. The package of claim 1 wherein the opening feature comprises a pattern of perforations.

11. The package of claim 1 wherein the opening feature comprises a pattern of scores.

12. The package of claim 1 wherein the opening feature comprises an embossed pattern.

13. A package comprising:
    at least one layer of foamed thin film wherein the layer of foamed thin film has a caliper of between about 10 and 250 microns and comprises between about 5% to 50% density reduction as compared to a non-foamed thin film of substantially the same caliper that does not comprise gaseous babbles, void volumes, or cells; and
    wherein the foamed thin film comprises plastic resin and a whitening additive that is added to the plastic resin, the whitening additive being selected to produce a foamed thin film having an opacity value of between about 35-99%; and an opening feature selected from the group consisting of a line of weakness and a die cut that defines a dispensing opening, formed in the layer of foamed thin film.

14. The package of claim 13 wherein the whitening agent comprises titanium dioxide.

15. The package of claim 6 wherein the foamed thin film co-extrusion comprises a top layer, a core layer, and a lower layer, wherein the core layer is a foamed thin film layer.

16. The package of claim 7 wherein the foamed thin film laminate comprises a top layer, a core layer, and a lower layer, wherein the core layer is a foamed thin film layer.

* * * * *